(12) United States Patent  (10) Patent No.: US 9,104,863 B2
Mao et al.  (45) Date of Patent: Aug. 11, 2015

(54) METHOD AND APPARATUS TO HARDEN A SOFTWARE EXECUTION IN RANDOM ACCESS MEMORY

(75) Inventors: Wenbo Mao, Beijing (CN); Ziye Yang, Beijing (CN)

(73) Assignee: EMC Corporation, Hopkinton, MA (US)

( * ) Notice: Subject to any disclaimer, the term of this patent is extended or adjusted under 35 U.S.C. 154(b) by 163 days.

(21) Appl. No.: 12/982,378

(22) Filed: Dec. 30, 2010

(65) Prior Publication Data

US 2012/0167211 A1   Jun. 28, 2012

(30) Foreign Application Priority Data

Dec. 23, 2010   (CN) .......................... 2010 1 0601493

(51) Int. Cl.
*G06F 21/52* (2013.01)
*G06F 21/55* (2013.01)
*G06F 21/56* (2013.01)
*G06F 21/51* (2013.01)

(52) U.S. Cl.
CPC .............. *G06F 21/554* (2013.01); *G06F 21/51* (2013.01); *G06F 21/52* (2013.01); *G06F 21/566* (2013.01); *G06F 2221/033* (2013.01)

(58) Field of Classification Search
USPC ...................................................... 726/22–25
See application file for complete search history.

(56) References Cited

U.S. PATENT DOCUMENTS

| 6,993,663 | B1 * | 1/2006 | Paya et al. ...................... 711/163 |
| 7,222,062 | B2 * | 5/2007 | Goud et al. ...................... 703/23 |
| 7,831,838 | B2 * | 11/2010 | Marr et al. ...................... 713/187 |
| 2009/0055656 | A1 * | 2/2009 | Mersh ........................... 713/187 |
| 2011/0088093 | A1 * | 4/2011 | Kang et al. ...................... 726/22 |

* cited by examiner

*Primary Examiner* — Jung Kim
*Assistant Examiner* — Tri Tran
(74) *Attorney, Agent, or Firm* — Krishnendu Gupta; Gerald P. Kazanjian (57) ABSTRACT

Example embodiments of the present invention relate to a system, apparatus and methods for preserving the integrity of a code to prevent it from being modified, maliciously or inadvertently, while it is in execution in the RAM of a computer platform. This method also may be referred to as code hardening. Code to be hardened in example embodiments of the present invention may be referred to as protected code. Example embodiments of the present invention are able to externally detect unauthorized stoppage of the hypervisor by employing (1) a launch-time metric of the protected code; (2) a run-time metric of the protected code; and (3) a liveliness indicator of the protected code.

24 Claims, 3 Drawing Sheets

METHOD AND APPARATUS TO HARDEN A SOFTWARE EXECUTION IN RANDOM ACCESS MEMORY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority from China application number 201010601493.6 filed on Dec. 23, 2010.

TECHNICAL FIELD

This application relates to validating integrity of executed protected code in memory of a computer platform.

BACKGROUND

A hypervisor (i.e., a Virtual Machine Monitor) manages the sharing of a hardware platform among multiple guest systems and generally is adopted as privileged software in Infrastructure as a Service (IaaS) in cloud computing. Hypervisors have a relatively small code base and limited interaction with the external world and, therefore, were assumed to be well-protected and easily verifiable.

SUMMARY

Example embodiments of the present invention relate to a method and apparatus for validating integrity of executed protected code in memory of a computer platform. The method includes receiving a launch-time metric of stored protected code from the computer platform, obtaining a run-time metric of the executed protected code from the computer platform, and obtaining a liveliness indicator of the executed protected code from the computer platform. The integrity of the executed protected code is then validated according to the launch-time metric, the run-time metric and the liveliness indicator.

Other example embodiments relate to a method and apparatus for validating integrity of executed protected code in memory with an external verifier by providing a launch-time metric of stored protected code to the external verifier, a run-time metric of executed protected code to the external verifier in response to a request for the run-time metric from the external verifier, and a liveliness indicator of the executed protected code to the external verifier in response to a request for the liveliness indicator from the external verifier, the request for the liveliness indicator sent from the external verifier if comparing the launch-time metric and the run-time metric at the external verifier succeeds.

Example embodiments of the present invention also include a system and a computer program product for carrying out method steps.

BRIEF DESCRIPTION OF THE DRAWINGS

The above and further advantages of the present invention may be better under stood by referring to the following description taken into conjunction with the accompanying drawings in which.

DETAILED DESCRIPTION

Hypervisors are not completely secure and are vulnerable to many attacks, such as hypervisor code and data being modified at runtime. Hypervisors face similar integrity threats as conventional operating systems so they require protection, measurement and verification of their integrity. Verifying the integrity of the hypervisor at system boot may be accomplished through conventional techniques such as a trusted boot. Likewise, conventional techniques for verifying the integrity of the hypervisor at runtime have been developed. However, such conventional techniques do not verify the integrity of the hypervisor while in execution in random access memory (RAM) of a computer platform. For example, such conventional techniques only protect the software version and cannot prevent the time-of-check-to-time-of-use (TOC2TOU) attack. In the TOC2TOU attack, the integrity of code may be compromised during an attack window from the time the integrity of the code is checked to the time the code is used. In many cases, the attack window can be an extended period.

Further, such conventional techniques are not suitable for use in a datacenter in which servers may be network booted. Network booting is the process of booting a computer from a network rather than a local drive. Without verification of the network boot source, integrity of the network boot source cannot reliably be assumed and, therefore, all booted servers may not be trusted.

Figure 1:
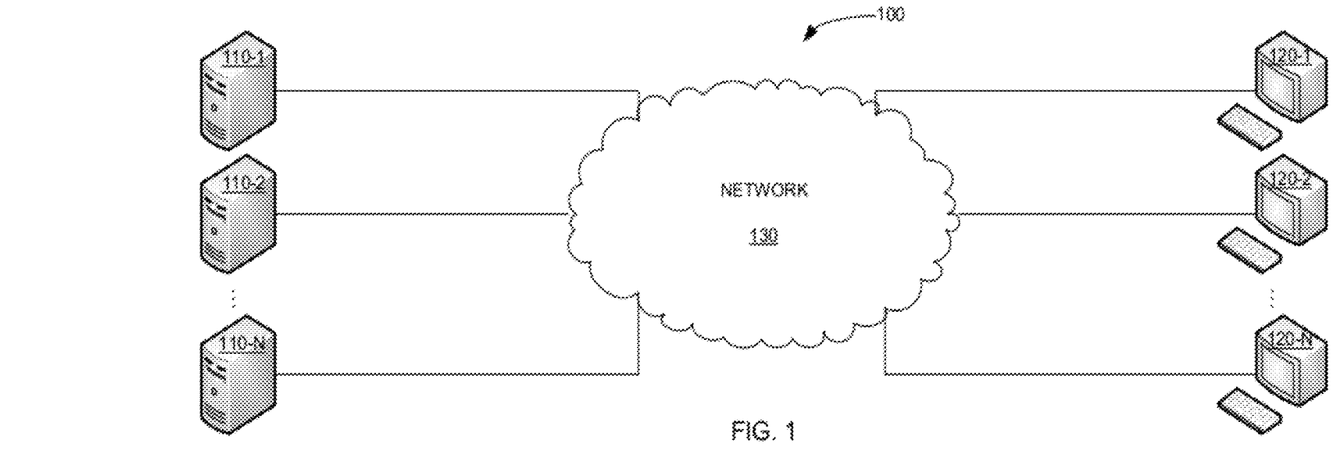
FIG. 1 is a diagram illustrating an example environment in which example embodiments of the present invention maybe employed.

FIG. 1 is a diagram illustrating an example environment 100 in which example embodiments of the present invention maybe employed. The environment 100 may be a cloud computing environment for Infrastructure as a Server (IaaS). The environment 100 includes a plurality of servers 110-1-110-N (110, generally) and a plurality of clients 120-1-120-N (120, generally) connected over a network 130, such as the Internet. Each server 110 may be a computer platform running a hypervisor (i.e., a Virtual Machine Monitor) that manages the sharing of the hardware platform among multiple guest systems (e.g., clients 120).

In certain scenarios it may be desirable to perform automatic load balancing of a plurality of processes between the servers 110 (i.e., hypervisors in a preferred embodiment) for virtual machines supporting the plurality of clients 120. The inventors have critically recognized that virtual machines may not be distributed evenly or advantageously across a plurality of hypervisors. Because of this, it is desirable to adjust the utilization of the hypervisors to more-efficiently balance the load of running hypervisors and virtual machines.

Hypervisors are not completely secure and are vulnerable to many attacks, such as hypervisor code and data being modified at runtime. Therefore, before transferring the process of a virtual machine from one server to another and, likewise, from one hypervisor managing the virtual machine to another, it is advantageous to verify the status of the hypervisor and that its servicing conditions have not changed since the hypervisor started running.

Figure 2:
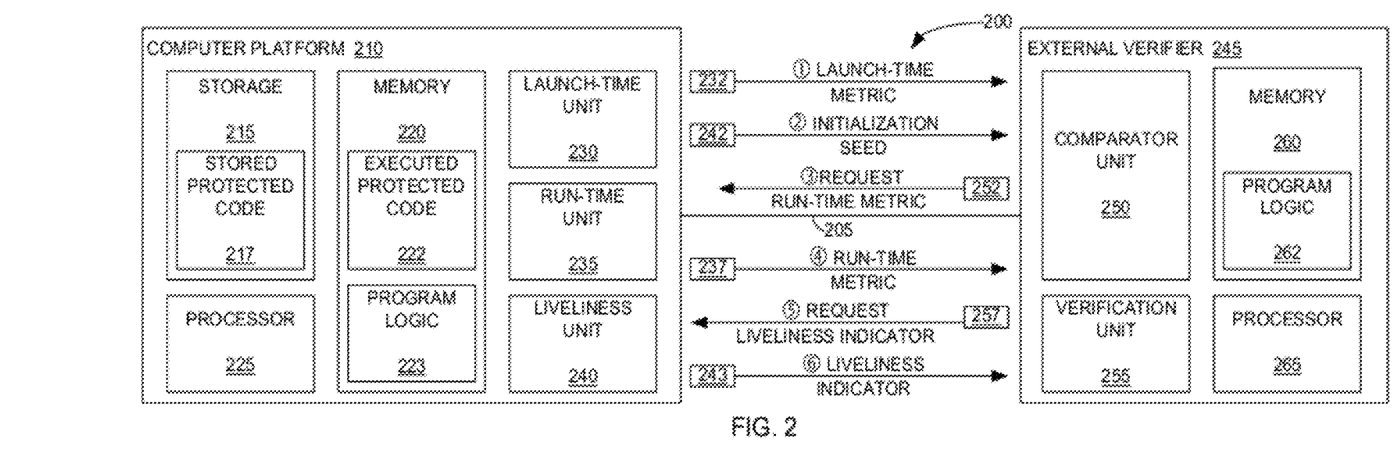
FIG. 2 is a block diagram illustrating an example embodiment system and apparatus of the present invention for validating integrity of protected code in execution in memory of a computer platform.

FIG. 2 is a block diagram illustrating an example embodiment system 200 of the present invention for validating integrity of protected code in execution in memory of a computer platform. The system 200 includes a computer platform 210 and an external verifier 245 connected over a network 205, such as the Internet.

The computer platform 210 may include open-architecture computing hardware (e.g., Intel X86 architecture) and software components. The computer platform 210 includes storage 215 for storing stored protected code 217 and memory 220, for storing executed protected code 222 and program logic 223 for validating integrity of executed protected code 222 in memory 220 with an external verifier 245, and a processor 225 for loading the stored protected code 217 into memory 220 and executing the executed protected code 222 and the program logic 223.

The computer platform 210 also includes a launch-time unit 230, a run-time unit 235 and a liveliness unit 240. The external verifier 245 includes a comparator unit 250 and a verification unit 255.

The launch-time unit 230 may be a trusted mechanism that includes a physically protected environment, such as Trusted Computing Group (TCG) technology or Trusted Execution Technology (TXT). At the launch time of the computer platform 210, the launch-time unit 230 measures the stored protected code 217. The measured result is referred to as a launch-time metric 232 and may be a hash of the stored protected code 217 stored in the storage 215. The launch-time unit 230 securely stores the launch-time metric 232 at the launch-time unit 230 for future attestation. In alternative embodiments, such as network boot servers, the launch-time metric 232 may be stored in physically secured network storage, such as in a Storage Area Network (SAN) (not shown).

The run-time unit 235 may be a trusted mechanism that includes a physically protected environment, such as a Direct Memory Access—(DMA) capable device with on-device information integrity protection capabilities. The run-time unit 235 can read the content of locations in the memory 220 after the computer platform 210 has launched. At the run time of the executed protected code 222, the run-time unit 235 reads the location in memory 220 storing the executed protected code 222 and measures the executed protected code 222 in response to an authorized instruction. The measured result is referred to as a run-time metric 237 and may be a hash of the executed protected code 222 stored in the memory 220.

The authorized instruction causing the run-time unit 235 to measure the executed protected code 222 and generate the run-time metric 237 may be a request for the run-time metric 252 sent by the comparator unit 250 of the external verifier 245. The comparator unit 250 is also configured to compare the launch-time metric 232 and the run-time metric 237 to determine whether the integrity of the stored protected code 217 was compromised at a time between the launch of the computer platform 210 and the runtime of the executed protected code 222.

The liveliness unit 240 manages a liveliness protocol mechanism between the computer platform 210 and the external verifier 245, such as the RSA SecureID® from RSA, The Security Division of EMC of Bedford, Mass., in a preferred embodiment. The liveliness unit 240 is initialized in such a manner that the computer platform 210 and the external verifier 245 share a secret, such as an initialization seed 242 (i.e., token). The shared secret is coded into a one-way function together with a reliable event, such as a time value, which is reliably known to both the computer platform 210 and the external verifier 245. At any time when the executed protected code 222 is in execution, the computer platform 210 may be requested by the external verifier 245 to generate a liveliness indicator 243 according to the liveliness protocol to detect whether the executed protected code 222 is in a liveliness synchronization with the mutually known reliable event (i.e., the executed protected code 222 has not been stopped or altered).

A comparator unit 250 of the external verifier 245 receives the launch-time metric 232 and receives the run-time metric 237 from the computer platform 210 in response to sending a request for the run-time metric 252 to the computer platform 210. The comparator unit 250 also compares the launch-time metric 232 and the run-time metric 237 and determines whether the launch-time metric 232 and the run-time metric 237 match. A verification unit 255 of the external verifier 245 may send a request for a liveliness indicator 257. The verification unit 255 is also configured to receive the initialization seed 242 sent by the liveliness unit 240 and the liveliness indicator 243 sent by the liveliness unit 240 and determine whether the liveliness indicator 243 conforms to the liveliness protocol instituted by the one-way function into which the initialization seed 242 is coded. The external verifier 245 also includes memory 260 for storing program logic 262, for validating integrity of executed protected code 222 in memory 220 of the computer platform 210, and a processor 265 for executing the program logic 262.

When the program logic 223, 262 is loaded into memory 220, 226 and executed by a machine (e.g., computer platform 210 or external verifier 245) the machine becomes an apparatus for practicing the invention. When implemented on one or more general-purpose processors (e.g., processors 225 and 265, respectively), the program logic 223, 262 combines with such a processor to provide a unique apparatus that operates analogously to specific logic circuits. As such, a general purpose digital machine can be transformed into a special purpose digital machine. Further, the processors 225, 265 running the program logic 223, 262 enable a new computer process for performing example embodiments of the present invention.

FIGS. 3A-3B and 4A-4B are flow diagrams illustrating example embodiment methods of the present invention performed at a computer platform (e.g., computer platform 210 of FIG. 2) and an external verifier (e.g., external verifier 245 of FIG. 2), respectively. FIGS. 3A-3B and 4A-4B will be described together, with concurrent references being made to elements in both FIG. 3A and FIG. 4A and, likewise, FIG. 3B and FIG. 4B, to illustrate, for example, the interaction between the method performed at the computer platform 210 (i.e., FIGS. 3A-3B) and the method performed at the external verifier 245 (i.e., FIGS. 4A-4B). Reference also will be made to elements in FIG. 2 to illustrate, for example, communications 222, 242, 262, 263, 252, 297 made between the computer platform 210 and the external verifier 245 in an example embodiment system 200 for validating integrity of executed protected code 222 in memory 220 of the computer platform 210.

Figure 3A:
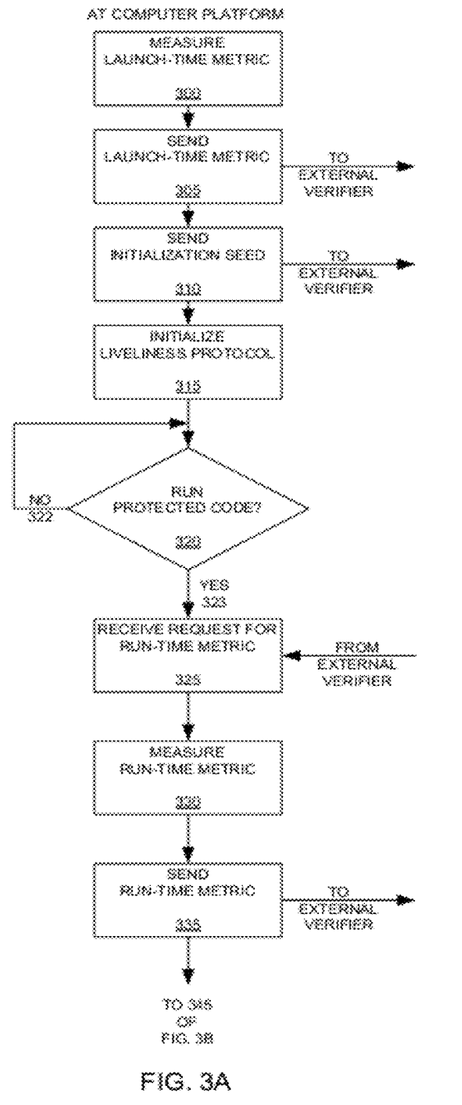
FIGS. 3A-3B are a flow diagram illustrating an example embodiment method of the present invention performed at a computer platform for validating integrity of executed protected code in memory with an external verifier.

At the launch time of the computer platform 210, the launch-time unit 230 measures the stored protected code 217 (300). The measured result is referred to as a launch-time metric 232 and may be a hash of the stored protected code 217. The launch-time unit 230 securely stores the launch-time metric 232 at the launch-time unit 230 for future attestation. The launch-time unit 230 also sends the launch-time metric 232 to the external verifier 245 (305). The liveliness unit 240 then sends an initialization seed 242 to the external verifier 245 (310) and initializes a liveliness protocol at the computer platform 210 (315).

Figure 4A:
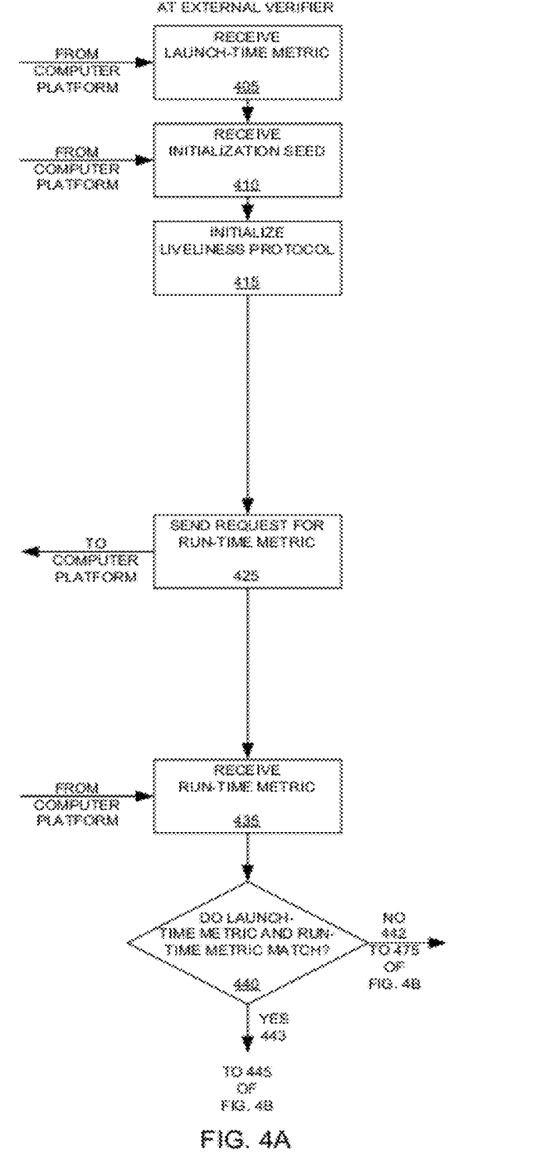
FIGS. 4A-4B are a flow diagram illustrating an example embodiment method of the present invention performed at an external verifier for validating integrity of executed protected code in memory of a computer platform.

The external verifier 245 receives the launch-time metric 232 from the computer platform 210 (405). The external verifier 245 also receives the initialization seed 242 from the computer platform 210 (410) and initializes the liveliness protocol at the external verifier 245 (415). Thus, the liveliness protocols at the computer platform 210 and the external verifier 245 are initialized in such a manner that the computer platform 210 and the external verifier 245 share a secret, such as the initialization seed 242 (i.e., token). As will be described further below, the shared secret may be coded into a one-way function together with a reliable event, such as a time value, which is reliably known to both the computer platform 210 and the external verifier 245.

The stored protected code 217 may reside in the storage 215 of the computer platform 210 for a period of time before it is executed. Thus, the computer platform 210 determines whether the stored protected code 217 is has been run (320). If the stored protected code 217 has not been run (322) then the computer platform 210 continues to wait.

However, if the stored protect code 217 has been run (323), the method continues to wait for a request for a run-time metric 252 to be sent from the external verifier (425). When the computer platform 210 receives the request for the run-time metric 252 from the external verifier 245 (325), the run-time unit 235 reads the content of the location in the memory 220 storing the executed protected code 222 and measures the executed protected code 222 (330) as the run-time metric 237. The run-time unit 235 then sends the run-time metric 237 to the external verifier 245 (335). The run-time metric 237 may be a hash of the executed protected code 222.

Figure 4B:
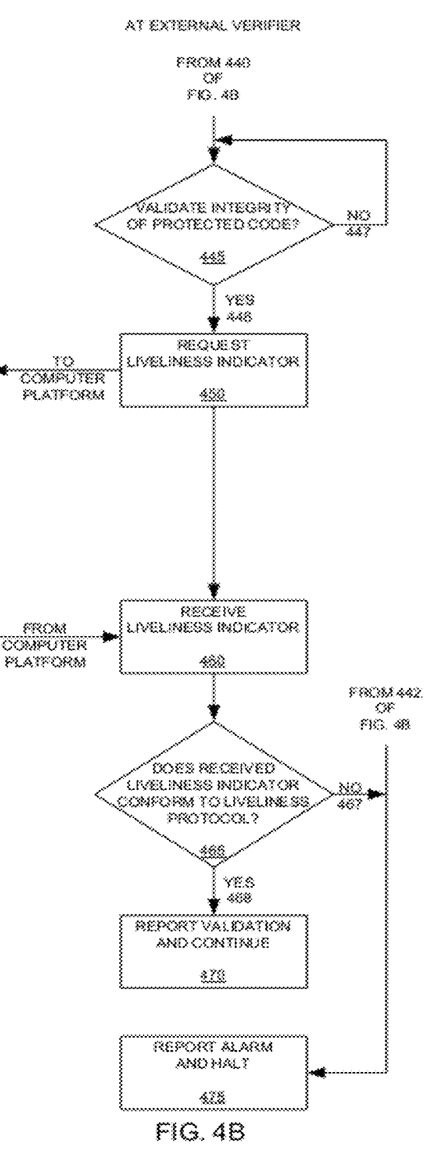

The comparator unit 250 then receives the run-time metric 237 from the computer platform 210 (435) and determines whether the launch-time metric 232 and the run-time metric 237 match (440). If the launch-time metric 232 and the run-time metric 237 do not match (442), the comparator unit 250 reports an alarm and halts (475). For example, the reported alarm may be reviewed by an operator of the external verifier 245, or a management server (not shown) to which the external verifier 245 reports the alarm, to check the status of the computer platform 210. However, if the launch-time metric 232 and the run-time metric 237 do match (443), the external verifier 245 continues to validate the integrity of the executed protected code 222 at a later time (445), as described below.

At any time when the executed protected code 222 is in execution at the computer platform 210, the external verifier 245 can determine that it should validate the integrity of the executed protected code 222 at the computer platform 210 (440). If validation is not necessary (447), the external verifier 245 continues to wait for an indication that it should validate the integrity of the executed protected code 222. For example, the external verifier 245 may define integrity validation rules, such as requiring the computer platform 210 to report the status of the protected code at an interval (e.g., five seconds).

Figure 3B:
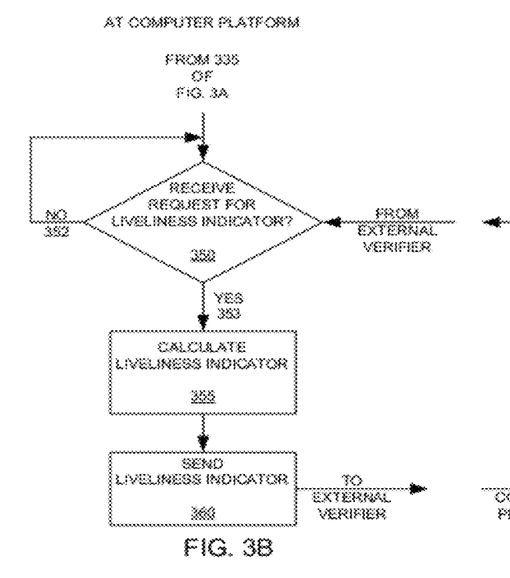

If the external verifier 245 determines that it should validate the integrity of the executed protected code 222 (448), the verification unit 255 sends a request for a liveliness indicator 257 from the computer platform 210 (450), generated by the liveliness unit 240 according to the liveliness protocol, to detect whether the executed protected code 222 is in a liveliness synchronization with the mutually known reliable event (i.e., the executed protected code 222 has not been stopped). Therefore, the computer platform 210 determines whether it has received a request for a liveliness indicator 257 (350).

If a request for a liveliness indicator 257 has not been received (352), then the computer platform 210 continues to wait. However, if a request for a liveliness indicator 257 has been received (353), the liveliness unit 240 calculates the requested liveliness indicator 243 (355) and sends the requested liveliness indicator 243 to the external verifier 245 (355).

The verification unit 255 then receives the liveliness indicator 243 from the computer platform 210 (460) and examines the liveliness indicator 243 to determine whether the received liveliness indicator 243 conforms to the liveliness protocol (465). As described above, the liveliness unit 240 was initialized in such a manner that the computer platform 210 and the external verifier 245 share a secret, such as the initialization seed 242 (i.e., token). Thus, the result of coding the shared secret in the one-way function together with the reliable event at the computer platform 210, which was sent to the external verifier 245 as the liveliness indicator 243, should correspond to the result of coding the shared secret in the one-way function together with the reliable event at the external verifier 245.

Therefore, if the received liveliness indicator 243 does not conform to the liveliness protocol (467), the verification unit 255 reports an alarm and halts (475). However, if the received liveliness indicator 243 does conform to the liveliness protocol (468), then the verification unit 255 reports a successful validation of the executed protected code 222 in memory 220 of the computer platform 210 and continues (470). For example, the external verifier 245 can wait for a further indication that it should validate the integrity of the protected code (445) or receive another run-time metric 237 (435) indicating that the executed protected code 222 has stopped and has been restarted.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 5:
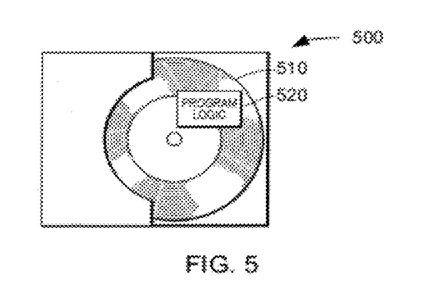
FIG. 5 is diagram illustrating an example embodiment method of the present invention embodied as program code or a program product.

FIG. 5 illustrates program logic 520 embodied on a computer-readable medium 510 as shown, and wherein the program logic 520 is encoded in computer-executable code configured for carrying out the method illustrated in FIGS. 1-4 and thereby forming a computer program product 500.

The logic for carrying out the method may be embodied as part of the aforementioned system, which is useful for carrying out a method described with reference to embodiments shown in, for example, FIGS. 1-4. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method comprising:
    receiving, from a computer platform at an external verifier, a launch-time metric of stored protected code, wherein the launch-time metric comprises a first measurement of stored protected code in storage of the computer platform generated at a first launch time of the computer platform;
    obtaining, from the computer platform at the external verifier, a run-time metric of the executed protected code, wherein the run-time metric comprises a second measurement of executed protected code in memory of the computer platform generated at a second run time after the first launch time but before a third validation time;
    obtaining, from the computer platform at the external verifier, a liveliness indicator of the executed protected code, wherein the liveliness indicator is initialized according to a shared secret between the computer platform and the external verifier and is indicative of whether the executed protected code in memory of the computer platform has been stopped or altered between the second run time and the third validation time; and
    validating, at the external verifier, the integrity of the executed protected code according to the launch-time metric, the run-time metric, and the liveliness indicator.

2. The method of claim 1 wherein validating, at the external verifier, the integrity of the executed protected code according to the launch-time metric, the run-time metric, and the liveliness indicator comprises:
    determining whether the launch-time metric and the run-time metric are equivalent;
    reporting an alert indicating compromise of the stored protected code if the launch-time metric and the run-time metric are not equivalent; and
    determining whether the executed protected code is in a liveliness state if the launch-time metric and the run-time metric are equivalent.

3. The method of claim 2 wherein determining whether the executed protected code is in a liveliness state if the launch-time metric and the run-time metric are equivalent comprises:
    determining if the liveliness indicator conforms to a liveliness protocol;
    reporting an alert indicating compromise of the executed protected code if the liveliness indicator does not conform to the liveliness protocol; and
    reporting validation of the executed protected code if the liveliness indicator does conform to the liveliness protocol.

4. The method of claim 3 wherein obtaining a liveliness indicator of the executed protected code from the computer platform comprises:
    receiving an initialization seed from the computer platform;
    initializing a one-way function of the liveliness protocol according to the initialization seed;
    requesting the liveliness indicator from the computer platform if the launch-time metric and the run-time metric are equivalent; and
    receiving the liveliness indicator.

5. The method of claim 4 wherein obtaining, from the computer platform at the external verifier, a run-time metric of the executed protected code comprises:
    sending a request for the run-time metric from the external verifier to the computer platform; and
    receiving the run-time metric from the computer platform at the external verifier, wherein the computer platform generates the run-time metric upon receipt of the request for the run-time metric by measuring the executed protected code at run time of the executed protected code.

6. A computer-implemented method comprising:
    providing, from a computer platform to an external verifier, a launch-time metric of stored protected code, wherein the launch-time metric comprises a first measurement of stored protected code in storage of the computer platform generated at a first launch time of the computer platform;
    providing, from a computer platform to an external verifier, a run-time metric of executed protected code, wherein the run-time metric comprises a second measurement of executed protected code in memory of the computer platform generated at a second run time after the first launch time but before a third validation time;
    providing, from the computer platform to the external verifier, a liveliness indicator of the executed protected code, wherein the liveliness indicator is initialized according to a shared secret between the computer platform and the external verifier and is indicative of whether the executed protected code in memory of the computer platform has been stopped or altered between the second run time and the third validation time; and
    receiving, from the external verifier at the computer platform, a notification regarding validity of the executed protected code determined according to the launch-time metric, the run-time metric, and the liveliness indicator.

7. The method of claim 6 wherein providing, from the computer platform to the external verifier, a liveliness indicator of the executed protected code comprises:
    providing an initialization seed from the computer platform to the external verifier; and
    initializing a one-way function of the liveliness protocol according to the initialization seed.

8. The method of claim 7
    wherein providing, from a computer platform to an external verifier, a launch-time metric of stored protected code comprises:
        measuring the stored protected code to generate the launch-time metric;
        storing the launch-time metric in a physically protected environment; and
        sending the launch-time metric from the computer platform to the external verifier;
    wherein providing, from the computer platform to the external verifier, a run-time metric of executed protected code comprises:
        receiving a request from the external verifier for the run-time metric;
        measuring the executed protected code to generate the run-time metric; and
        sending the run-time metric from the computer platform to the external verifier; and wherein providing, from the computer platform to the external verifier, a liveliness indicator of the executed protected code further comprises:
receiving a request for the liveliness indicator from the external verifier if comparing the launch-time metric and the run-time metric at the external verifier succeeds;
calculating the liveliness indicator according to the liveliness protocol; and
sending the liveliness indicator from the computer platform to the external verifier.

9. An apparatus comprising:
a comparator unit configured to receive a launch-time metric of stored protected code from a computer platform and obtain a run-time metric of the executed protected code from the computer platform, wherein the launch-time metric comprises a first measurement of stored protected code in storage of the computer platform generated at a first launch time of the computer platform and wherein the run-time metric comprises a second measurement of executed protected code in memory of the computer platform generated at a second run time after the first launch time but before a third validation time; and
a verification unit configured to obtain a liveliness indicator of the executed protected code from the computer platform and validate the integrity of the executed protected code according to the launch-time metric, the run-time metric, and the liveliness indicator, wherein the liveliness indicator is initialized according to a shared secret between the computer platform and the external verifier and is indicative of whether the executed protected code in memory of the computer platform has been stopped or altered between the second run time and the third validation time.

10. The apparatus of claim 9
wherein the comparator unit is further configured to determine whether the launch-time metric and the run-time metric are equivalent and report an alert indicating compromise of the stored protected code if the launch-time metric and the run-time metric are not equivalent; and
wherein the verification unit is further configured to determine if the liveliness indicator conforms to a liveliness protocol, report an alert indicating compromise of the executed protected code if the liveliness indicator does not conform to the liveliness protocol, and report validation of the executed protected code if the liveliness indicator does conform to the liveliness protocol.

11. The apparatus of claim 10 wherein the verification unit is further configured to receive an initialization seed from the computer platform, initialize a one-way function of the liveliness protocol according to the initialization seed, request the liveliness indicator from the computer platform if the launch-time metric, and the run-time metric are equivalent, and receive the liveliness indicator.

12. An apparatus comprising:
a launch-time unit configured to provide a launch-time metric of stored protected code to an external verifier, wherein the launch-time metric comprises a first measurement of stored protected code in storage of the computer platform generated at a first launch time of the computer platform;
a run-time unit configured to provide a run-time metric of executed protected code to the external verifier, wherein the run-time metric comprises a second measurement of executed protected code in memory of the computer platform generated at a second run time after the first launch time but before a third validation time; and
a liveliness unit configured to provide a liveliness indicator of the executed protected code to the external verifier, wherein the liveliness indicator is initialized according to a shared secret between the computer platform and the external verifier and is indicative of whether the executed protected code in memory of the computer platform has been stopped or altered between the second run time and the third validation time.

13. The apparatus of claim 12
wherein the launch-time unit is further configured to measure the stored protected code to generate the launch-time metric, store the launch-time metric in a physically protected environment, and send the launch-time metric to the external verifier;
wherein the run-time unit is further configured to receive a request from the external verifier for the run-time metric, measure the executed protected code to generate the run-time metric, and send the run-time metric to the external verifier; and
wherein the liveliness unit is further configured to provide an initialization seed to the external verifier, initialize a one-way function of a liveliness protocol according to the initialization seed, receive a request for the liveliness indicator from the external verifier if comparing the launch-time metric and the run-time metric at the external verifier succeeds, calculate the liveliness indicator according to the one-way function of the liveliness protocol initialized by the initialization seed, and provide the liveliness indicator to the external verifier.

14. A system comprising
a computer platform comprising:
a launch-time unit configured to provide a launch-time metric of stored protected code to an external verifier;
a run-time unit configured to provide a run-time metric of executed protected code to an external verifier; and
a liveliness unit configured to provide a liveliness indicator of the executed protected code to the external verifier; and an external verifier comprising:
a comparator unit configured to receive a launch-time metric of stored protected code from the computer platform and obtain a run-time metric of the executed protected code from the computer platform; and
a verification unit configured to obtain a liveliness indicator of the executed protected code from the computer platform and a validate the integrity of the executed protected code according to the launch-time metric, the run-time metric, and the liveliness;
wherein the launch-time metric comprises a first measurement of stored protected code in storage of the computer platform generated at a first launch time of the computer platform;
wherein the run-time metric comprises a second measurement of executed protected code in memory of the computer platform generated at a second time after the first launch time but before a third validation time; and
wherein the liveliness indicator is initialized according to a shared secret between the computer platform and the external verifier and is indicative of whether the executed protected code in memory of the computer platform has been stopped or altered between the second run time and the third validation time.

15. The system of claim 14
wherein the launch-time unit is further configured to measure the stored protected code to generate the launch-time metric, store the launch-time metric in a physically protected environment, and send the launch-time metric to the external verifier;

wherein the run-time unit is further configured to receive a request from the external verifier for the run-time metric, measure the executed protected code to generate the run-time metric, and send the run-time metric to the external verifier; and wherein the liveliness unit is further configured to provide an initialization seed to the external verifier, initialize a one-way function of a liveliness protocol according to the initialization seed, receive a request for the liveliness indicator from the external verifier if comparing the launch-time metric and the run-time metric at the external verifier succeeds, calculate the liveliness indicator according to the one-way function of the liveliness protocol initialized by the initialization seed, and provide the liveliness indicator to the external verifier.

16. The system of claim 15 wherein the comparator unit is further configured to determine whether the launch-time metric and the run-time metric are equivalent, report an alert indicating compromise of the stored protected code if the launch-time metric and the run-time metric are not equivalent, and request the liveliness indicator if the launch-time metric and the run-time metric are equivalent; and wherein the verification unit is further configured to receive an initialization seed from the computer platform, initialize the one-way function of a liveliness protocol according to the initialization seed, receive the liveliness indicator of the executed protected code from the computer platform according to the liveliness protocol, determine if the liveliness indicator conforms to the one-way function of the liveliness protocol initialized according to the initialization seed, report an alert indicating the compromise of the executed protected code if the liveliness indicator does not conform to the liveliness protocol, and report validation of the executed protected code if the liveliness indicator does conform to the liveliness protocol.

17. A computer program product having a non-transitory computer readable storage medium operable to store computer program logic embodied in computer program code encoded thereon for validating integrity of executed protected code in memory of a computer platform at an external verifier comprising:

computer program code for receiving, from the computer platform at the external verifier, a launch-time metric of stored protected code, wherein the launch-time metric comprises a first measurement of stored protected code in storage of the computer platform generated at a first launch time of the computer platform;

computer program code for obtaining, from the computer platform at the external verifier, a run-time metric of the executed protected code, wherein the run-time metric comprises a second measurement of executed protected code in memory of the computer platform generated at a second run time after the first launch time but before a third validation time;

computer program code for obtaining, from the computer platform at the external verifier, a liveliness indicator of the executed protected code, wherein the liveliness indicator is initialized according to a shared secret between the computer platform and the external verifier and is indicative of whether the executed protected code in memory of the computer platform has been stopped or altered between the second run time and the third validation time; and computer program code for validating, at the external verifier, the integrity of the executed protected code at according to the launch-time metric, the run-time metric, and the liveliness indicator.

18. The computer program product of claim 17 wherein computer program code for validating, at the external verifier, the integrity of the executed protected code according to the launch-time metric, the run-time metric, and the liveliness indicator comprises:

computer program code for determining whether the launch-time metric and the run-time metric are equivalent;

computer program code for reporting an alert indicating compromise of the stored protected code if the launch-time metric and the run-time metric are not equivalent; and computer program code for determining whether the executed protected code is in a liveliness state if the launch-time metric and the run-time metric are equivalent.

19. The computer program product of claim 18 wherein computer program code for determining whether the executed protected code is in a liveliness state if the launch-time metric and the run-time metric are equivalent comprises:

computer program code for determining if the liveliness indicator conforms to a liveliness protocol;

computer program code for reporting an alert indicating compromise of the executed protected code if the liveliness indicator does not conform to the liveliness protocol; and computer program code for reporting validation of the executed protected code if the liveliness indicator does conform to the liveliness protocol.

20. The computer program product of claim 19 wherein computer program code for obtaining a liveliness indicator of the executed protected code from the computer platform comprises:

computer program code for receiving an initialization seed from the computer platform;

computer program code for initializing a one-way function of the liveliness protocol according to the initialization seed;

computer program code for requesting the liveliness indicator from the computer platform if the launch-time metric and the run-time metric are equivalent; and computer program code for receiving the liveliness indicator.

21. The computer program product of claim 20 wherein computer program code for obtaining, from the computer platform at the external verifier, a run-time metric of the executed protected code comprises:

computer program code for sending a request for the run-time metric from the external verifier to the computer platform; and computer program code for receiving the run-time metric from the computer platform at the external verifier, wherein the computer platform generates the run-time metric upon receipt of the request for the run-time metric by measuring the executed protected code at run time of the executed protected code.

22. A computer program product having a non-transitory computer readable storage medium operable to store computer program logic embodied in computer program code encoded thereon for validating integrity of executed protected code in memory of a computer platform with an external verifier comprising:

computer program code for providing, from the computer platform to the external verifier, a launch-time metric of stored protected code, wherein the launch-time metric comprises a first measurement of stored protected code in storage of the computer platform generated a first launch time of the computer platform;

computer program code for providing, from the computer platform to the external verifier, a run-time metric of executed protected code, wherein the run-time metric comprises a second measurement of executed protected code in memory of the computer platform generated at a second run time after the first launch time but before a third validation time; and computer program code for providing, from the computer platform to the external verifier, a liveliness indicator of the executed protected code, wherein the liveliness indicator is initialized according to a shared secret between the computer platform and the external verifier and is indicative of whether the executed protected code in memory of the computer platform has been stopped or altered between the second run time and the third validation time.

23. The computer program product of claim 22 wherein computer program code providing, from the computer platform to the external verifier, a liveliness indicator of the executed protected code comprises:

computer program code for providing an initialization seed from the computer platform to the external verifier; and computer program code for initializing a one-way function of the liveliness protocol according to the initialization seed.

24. The computer program product of claim 23
wherein computer program code for providing, from a computer platform to an external verifier, a launch-time metric of the stored protected code comprises:

computer program code for measuring the stored protected code to generate the launch-time metric;

computer program code for storing the launch-time metric in a physically protected environment; and computer program code for sending the launch-time metric from the computer platform to the external verifier;

wherein computer program code for providing, from the computer platform to the external verifier, a run-time metric of the executed protected code comprises:

computer program code for receiving a request from the external verifier for the run-time metric;

computer program code for measuring the executed protected code to generate the run-time metric; and computer program code for sending the run-time metric from the computer platform to the external verifier; and wherein computer program code for providing, from the computer platform to the external verifier, a liveliness indicator of the executed protected code further comprises:

computer program code for receiving a request for the liveliness indicator from the external verifier if comparing the launch-time metric and the run-time metric at the external verifier succeeds;

computer program code for calculating the liveliness indicator according to the liveliness protocol; and computer program code for sending the liveliness indicator from the computer platform to the external verifier.

* * * * *